United States Patent
Ye et al.

(10) Patent No.: US 9,262,869 B2
(45) Date of Patent: Feb. 16, 2016

(54) METHOD OF 3D MODEL MORPHING DRIVEN BY FACIAL TRACKING AND ELECTRONIC DEVICE USING THE METHOD THE SAME

(71) Applicant: UL See Inc., Taipei (TW)

(72) Inventors: Zhou Ye, Foster City, CA (US); Ying-Ko Lu, Taoyuan County (TW); Yi-Chia Hsu, Tainan (TW); Sheng-Wen Jeng, Taipei (TW)

(73) Assignee: UL See Inc., Taipei (TW)

( * ) Notice: Subject to any disclaimer, the term of this patent is extended or adjusted under 35 U.S.C. 154(b) by 186 days.

(21) Appl. No.: 13/940,270

(22) Filed: Jul. 12, 2013

(65) Prior Publication Data

US 2014/0022249 A1    Jan. 23, 2014

Related U.S. Application Data

(60) Provisional application No. 61/670,638, filed on Jul. 12, 2012.

(51) Int. Cl.
| | | |
|---|---|---|
| *G06T 19/20* | (2011.01) | |
| *G06T 13/40* | (2011.01) | |
| *G06K 9/00* | (2006.01) | |
| *G06K 9/46* | (2006.01) | |
| *G06T 7/20* | (2006.01) | |

(52) U.S. Cl.
CPC ............ *G06T 19/20* (2013.01); *G06K 9/00214* (2013.01); *G06K 9/00228* (2013.01); *G06K 9/4671* (2013.01); *G06T 7/2046* (2013.01); *G06T 13/40* (2013.01); *G06T 2207/20101* (2013.01); *G06T 2207/30201* (2013.01); *G06T 2210/44* (2013.01); *G06T 2219/2021* (2013.01)

(58) Field of Classification Search
None
See application file for complete search history.

(56) References Cited

U.S. PATENT DOCUMENTS

| | | |
|---|---|---|
| 6,829,384 B2 | 12/2004 | Schneiderman et al. |
| 6,980,671 B2 | 12/2005 | Liu et al. |
| 7,043,056 B2 | 5/2006 | Edwards et al. |
| 7,082,212 B2 | 7/2006 | Liu et al. |
| 7,133,540 B2 | 11/2006 | Liu et al. |
| 7,142,698 B2 | 11/2006 | Liu et al. |
| 7,149,329 B2 | 12/2006 | Liu et al. |

(Continued)

OTHER PUBLICATIONS

Parke, F., Computer Generated Animation of Faces, ACM 1972, pp. 451-457.*

*Primary Examiner* — Said Broome
(74) *Attorney, Agent, or Firm* — Alan D. Kamrath; Kamrath IP Lawfirm, P.A.

(57) ABSTRACT

A method of 3D morphing driven by facial tracking is provided. First, a 3D model is loaded. After that, facial feature control points and boundary control points are picked up respectively. A configure file "A.config" including the facial feature control points and boundary control points data that are picked up corresponding to the 3D avatar is saved. Facial tracking algorithm is started, and then "A.config" is loaded. After that, controlled morphing of a 3D avatar by facial tracking based on "A.config" is performed in real time by a deformation method having control points. Meanwhile, teeth and tongue tracking of the real-time face image, and scaling, translation and rotation of the real-time 3D avatar image is also provided. In addition, a control point reassignment and reconfiguration method, and a pupil movement detection method is also provided in the method of 3D morphing driven by facial tracking.

19 Claims, 21 Drawing Sheets
(18 of 21 Drawing Sheet(s) Filed in Color)

(56) References Cited

U.S. PATENT DOCUMENTS

| | | |
|---|---|---|
| 7,149,330 B2 | 12/2006 | Liu et al. |
| 7,158,658 B2 | 1/2007 | Liu et al. |
| 7,174,035 B2 | 2/2007 | Liu et al. |
| 7,181,051 B2 | 2/2007 | Liu et al. |
| 7,194,114 B2 | 3/2007 | Schneiderman et al. |
| 7,209,577 B2 | 4/2007 | McAlpine et al. |
| 7,224,367 B2 * | 5/2007 | Miyahara et al. .............. 345/473 |
| 7,397,932 B2 | 7/2008 | McAlpine et al. |
| 7,460,693 B2 | 12/2008 | Loy et al. |
| 7,627,502 B2 | 12/2009 | Cheng et al. |
| 7,653,213 B2 | 1/2010 | Longhurst et al. |
| 7,848,566 B2 | 12/2010 | Schneiderman et al. |
| 7,881,505 B2 | 2/2011 | Schneiderman et al. |
| 7,917,935 B2 | 3/2011 | McAlpine et al. |
| 2011/0102553 A1 * | 5/2011 | Corcoran et al. ............... 348/50 |

\* cited by examiner

FIG. 8

METHOD OF 3D MODEL MORPHING DRIVEN BY FACIAL TRACKING AND ELECTRONIC DEVICE USING THE METHOD THE SAME

BACKGROUND OF THE INVENTION

1. Field of the Invention

The present invention relates to a method of 3D model morphing, and more particularly, to a method of 3D model morphing driven by facial tracking, and an electronic device adopting the method of 3D model morphing driven by facial tracking.

2. Description of the Prior Art

Please refer to FIG. 1. FIG. 1 is a diagram showing a traditional 3D model morphing and motion capture technique. In FIG. 1, the traditional 3D model morphing and motion capturing that are commonly applied in commercial movies' visual effects usually use high speed camera to capture a large number of color-dot tags disposed on a subject or user (i.e. a whole person). These color-dot tags are typically pasted in advance on the subject or user's face to track facial expression. However, it's highly inconvenient and non-intuitive to paste such large number of color-dot tags on the face.

Hence, how to improve the method of 3D morphing has become an important topic in this field, and thus there is room for improvement in the art.

SUMMARY OF THE INVENTION

It is one of the objectives of the present invention to provide a method of 3D morphing driven by facial tracking that does not require pasting of large number of color-dot tags on the subject.

It is one of the objectives of the present invention to provide an electronic device adopted to use the method of 3D morphing driven by facial tracking that does not require of using large number of color-dot tags being pasted on the subject.

According to an embodiment of the present invention, a method of 3D morphing driven by facial tracking is provided. In the method of 3D morphing according to the embodiment, the use of any color-dot tag for pasting on the subject(s) is not required.

According to an embodiment of the present invention, an electronic device adapted to use the method of real-time 3D morphing driven by real-time facial tracking is provided. In the usage of the electronic device for providing real-time 3D morphing, the use of any color-dot tag for pasting on the subject(s) is not required.

According to an embodiment of the present invention, a plurality of facial feature control points and a plurality of boundary control points are defined and picked up from vertices on the 3D model to generate deformation to a plurality of tracking points during facial tracking. Each facial feature control point or boundary control point is corresponding to one tracking point. In addition, a plurality of boundary control points are defined and picked up from other vertices on the 3D model to define the physical boundary formed between a deformable region that includes the face, the forehead, and an upper portion of the neck region, and a non-deformable region which includes the head, hair, a lower portion of the neck region, and the rest of the body that are not affected by facial expressions of the 3D model.

According to an embodiment of the present invention, a control point pickup method is provided. In addition, the position or location of the picked up facial feature or boundary control points can be revised at any time by dragging a cursor using a mouse or a touch screen.

According to an embodiment of the present invention, a control point reassignment and reconfiguration method is provided.

According to an embodiment of the present invention, a boundary control point pickup method is provided.

According to an embodiment of the present invention, a deformation method to control a deformation of the positions of the vertices in the 3d model using equations for producing a real-time morphed 3D avatar image is provided.

According to an embodiment of the present invention, a method for achieving morphing effects on specified individual region of a real-time facial image of a person to obtain more exaggerated bigger movements is provided.

According to an embodiment of the present invention, a pupil movement detection method is provided during facial tracking.

According to an embodiment of the present invention, a method to track teeth and tongue of the real-time captured facial image of a person by using a camera, in particular to tongue and teeth displacement is provided.

According to an embodiment of the present invention, scaling, translation and rotation of the real-time 3D avatar image is provided.

According to an embodiment of the present invention, a hair flowing effect simulation implementation method is provided.

According to an embodiment of the present invention, another hair flowing effect simulation method incorporated with 3D animation software is further provided.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The application file contains at least one drawing executed in color. Copies of this patent or patent application publication with color drawing(s) will be provided by the Office upon request and payment of the necessary fee.

The present invention is illustrated by way of example and not limitation in the figures of the accompanying drawings in which like references indicate similar elements. Besides, many aspects of the disclosure can be better understood with reference to the following drawings. Moreover, in the drawings like reference numerals designate corresponding elements throughout. Wherever possible, the same reference numerals are used throughout the drawings to refer to the same or like elements of an embodiment.

FIG. 8 is a diagram containing detailed description of the location data for the control points corresponding to the 3D model to be organized as a file according to the embodiment of the present invention.

DETAILED DESCRIPTION OF THE INVENTION

Figure 1:
FIG. 1 is a diagram showing a traditional 3D model morphing technique.

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

In the descriptions of the embodiments of the present invention, several terms or phrases have been specifically defined and utilized so as to provide sufficient description of various technical aspects for understand of the present invention. A 3D model for providing morphing capability used in the instant disclosure is also referred to as the 3D model. A real-time captured facial image of a person by a camera is also referred to as a real-time facial image. A real-time 3D avatar image with derived morphing of facial features from the real-time captured facial image of the person is also referred to as the real-time 3D avatar morphing image. Facial feature control points are specific points that have being picked up or assigned to the corresponding vertices located in the meshed contour of the 3D model. Boundary control points are specific points that have been picked up or assigned to some of the available vertices on the 3D model to define the boundary between a deformable region that includes the face, the forehead, and an upper portion of the neck region of the 3D model, for providing image morphing capability, and a non-deformable region which includes the head, hair, a lower portion of the neck region, and the rest of the body that are not affected by facial expressions of the 3D model. Tracking points of the real-time facial image are similarly configured with respect to the corresponding facial feature control points or boundary control points of the 3D model in a one to one relationship. Driving points belong to the real-time 3D avatar morphing image, and each driving point thereof can be configured to be in a one to one relationship to each of the tracking points of the real-time facial image. Meanwhile however, the total number of driving points can also be configured to less than or equal to the total number of facial feature control points, and thus be less the total number of the tracking points. Meanwhile, each of the tracking points is assigned in a one to one relationship to each of the respective facial feature control points. In addition, each of the driving points on the real-time 3D avatar image is derived from each of the respective facial feature control points of the 3D model, respectively. In other words, one driving point can be a subset of facial feature control point. In a particular embodiment, the total number of driving points is less than or equal to the total number of the facial feature control points.

Figure 2:
FIG. 2 is a diagram illustrating a basic concept of a method of 3D morphing driven by facial tracking according to an embodiment of the present invention.

FIG. 2 is a diagram illustrating a basic concept of a method of 3D morphing driven by facial tracking according to an embodiment of the present invention. Referring to FIG. 2, a 3D model is first provided, in which a user then assigns and configure (referred herein also as the term "picked up") a plurality of facial feature control points and a plurality of boundary control points onto a plurality of selected vertices on the 3D model. Later, combining with the real-time facial tracking of a face of a person and real-time facial image capturing of the person by a camera, a plurality of tracking points which are directly corresponding to the facial feature control points can be generated onto the face to be shown during real-time facial tracking if need be. Finally, a real-time 3D avatar morphing image having derived morphing of facial features is obtained from the captured facial image of the person.

Figure 3:
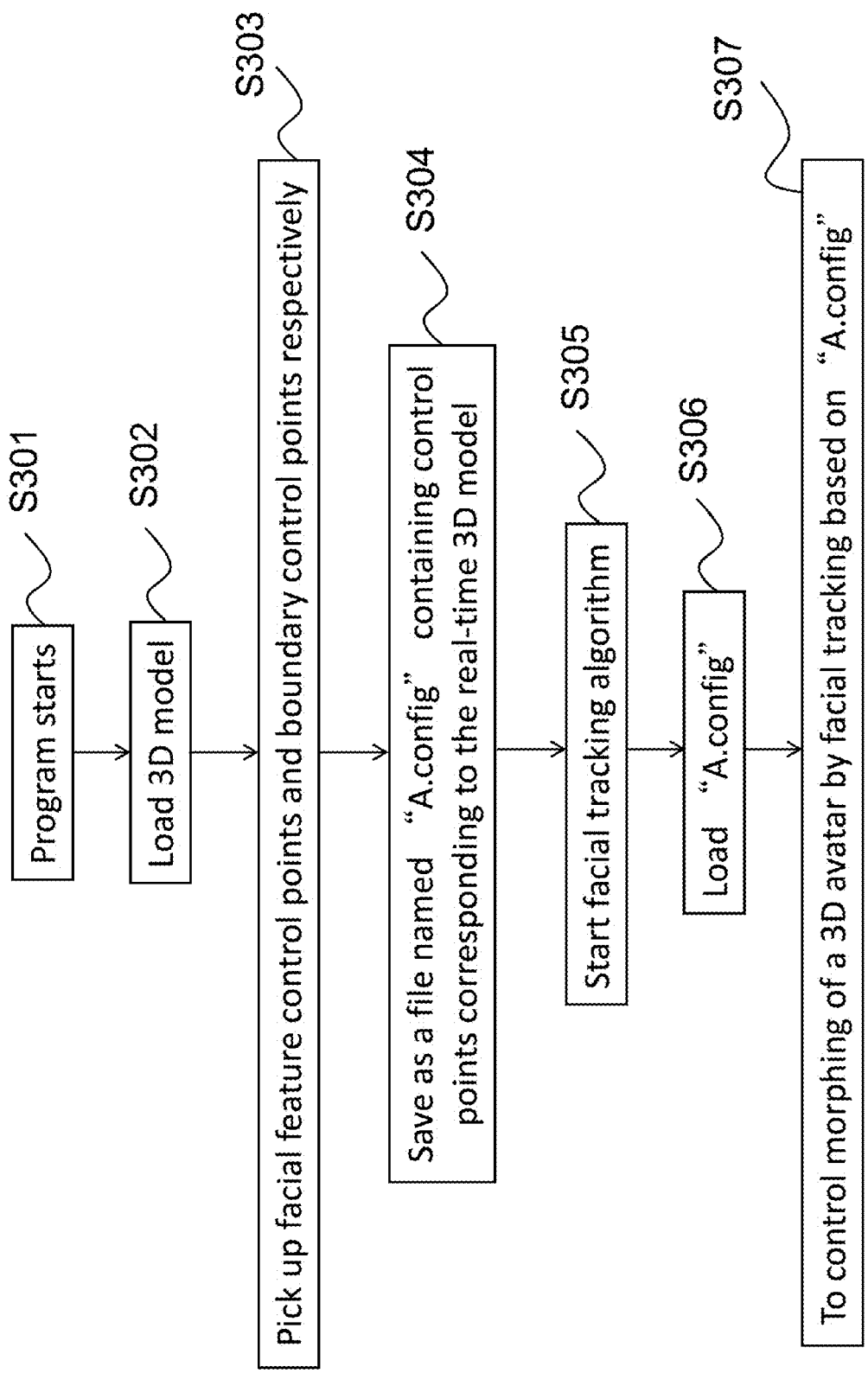
FIG. 3 is a flow chart illustrating a method of 3D morphing driven by facial tracking according to the embodiment of the present invention.

FIG. 3 is a flow chart illustrating a method of 3D morphing driven by facial tracking according to the embodiment of the present invention. First, in Step S301, the method is initiated or started. In Step S302, a 3D model is loaded. After that, in step S303, a plurality of facial feature control points and a plurality of boundary control points are picked up (selected or assigned) and configured by a user, respectively. In Step S304, a configuration file named "A.config" containing the respective data for the facial feature control points and boundary control points are in the form of vertices corresponding to the real-time 3D model, and are saved. In Step S305, a facial tracking algorithm is then started. In Step S306, "A.config" is loaded into the facial tracking algorithm. After that, in Step S307, the morphing of a 3D avatar by facial tracking based on "A.config" is performed.

Figure 4:
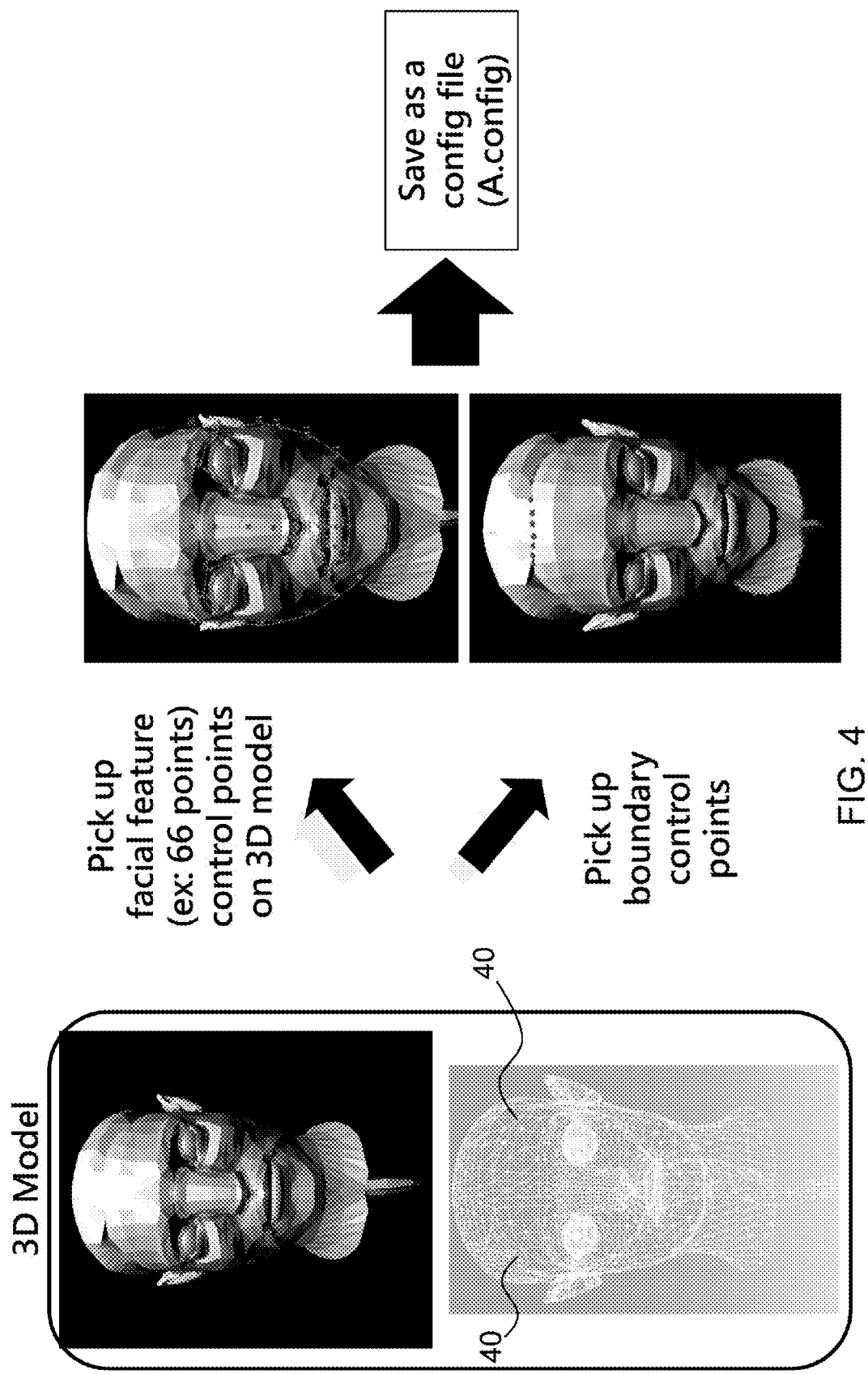
FIG. 4 is a diagram illustrating a method for configuring and setting up a plurality of facial feature control points and boundary control points on a 3D model according to the embodiment.
Figure 5B:
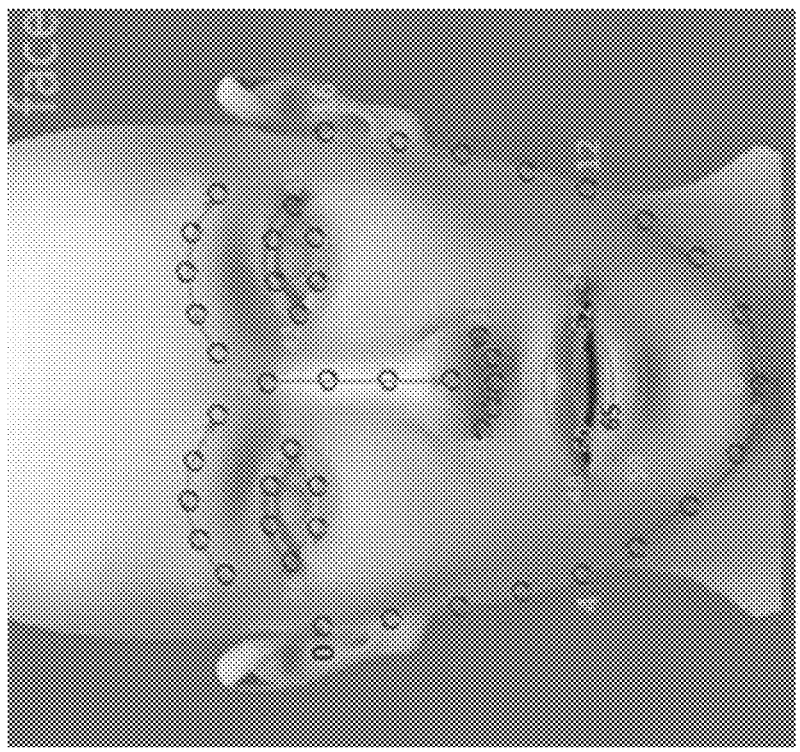
FIGS. 5A and 5B are diagrams illustrating a control point pickup method according to a first embodiment of the present invention.
Figure 5A:
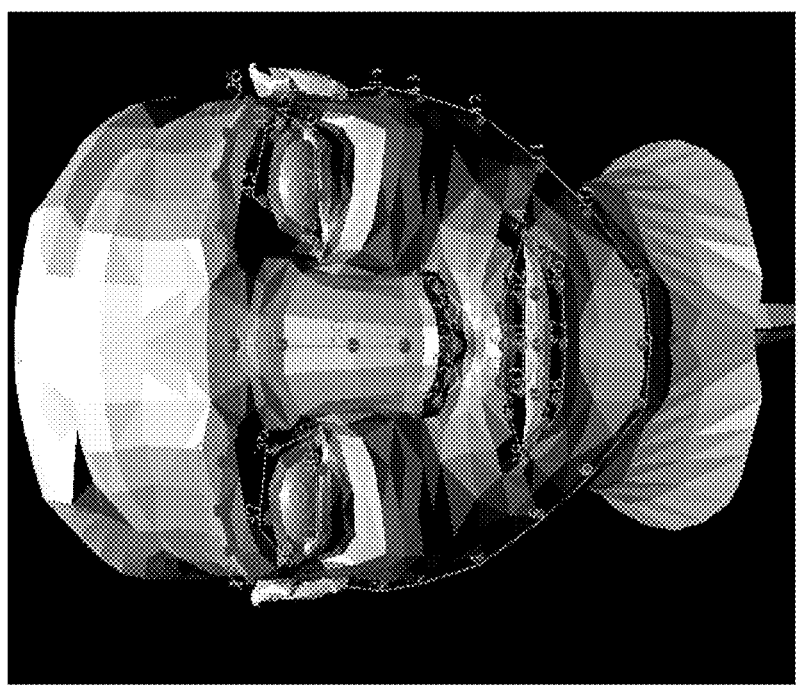

In FIGS. 4, 5A, and 5B, the facial feature control points are picked up from some of the available 3D vertices chosen on the 3D model to generate deformation to the tracking points, and are correlated to be corresponding to the movement of the tracking points of the facial features used during facial tracking. In addition, the boundary control points are picked up from some of the available 3D vertices on the 3D model which are chosen so as to define the boundary between a deformable region that includes the face, the forehead, and an upper portion of the neck region, and a non-deformable region which includes the head, hair, a lower portion of the neck region, and the rest of the body that are not affected by facial expressions. The facial feature control points and the boundary control points are recorded and saved in a config file "A.config" in the illustrated embodiment.

Referring to FIG. 4, the method for configuring and setting up a plurality of facial feature control points and boundary control points on the 3D model according to the embodiment is shown. A 3D model is depicted in both shaded view as well as in the form of mesh contour having thousands of triangular meshes with thousands of vertices 40. A user then configures a set of facial feature control points and boundary control points one by one, in increment of one, i.e. control point 1, control point 2, control point 3, etc. . . . , to be accurately sequentially configured in order, and attached to each specified facial location to the 3D model as shown in FIG. 5A. Each of the numbered control point, i.e. control point 22 is shown in green color in the 3D model. During the configuring of each facial feature control point, the nearest adjacent vertex 40 is illuminated or lit up automatically upon the hovering of the cursor in a nearby or adjacent location thereof, so as to enable the entire process of selecting and picking up the desired vertex on the 3D model as the desired location of the facial feature control point to be more an easier process, thereby consuming less time to perform. The user then continues performing the picking up and setting up of the facial feature control points to be locked on the corresponding vertices 40, one by one sequentially, until a total of 66 facial feature control points have been correctly picked up and locked on the corresponding 66 vertices on the 3D model. Please note in this embodiment, no facial feature control points should be skipped over. In other words, i.e. if the user is currently configuring control point 25, then the next control point should be control point 26, and should not be control point 27 or control point 29. In other embodiments, a total of 72 facial feature control points, or 78 facial feature control points can be used instead of 66 facial feature control points. The numbering order of the facial feature control points for the 3D model coincides side-by-side to the correspondingly numbering order for the tracking points for the real-time face image of the person.

Figure 6:
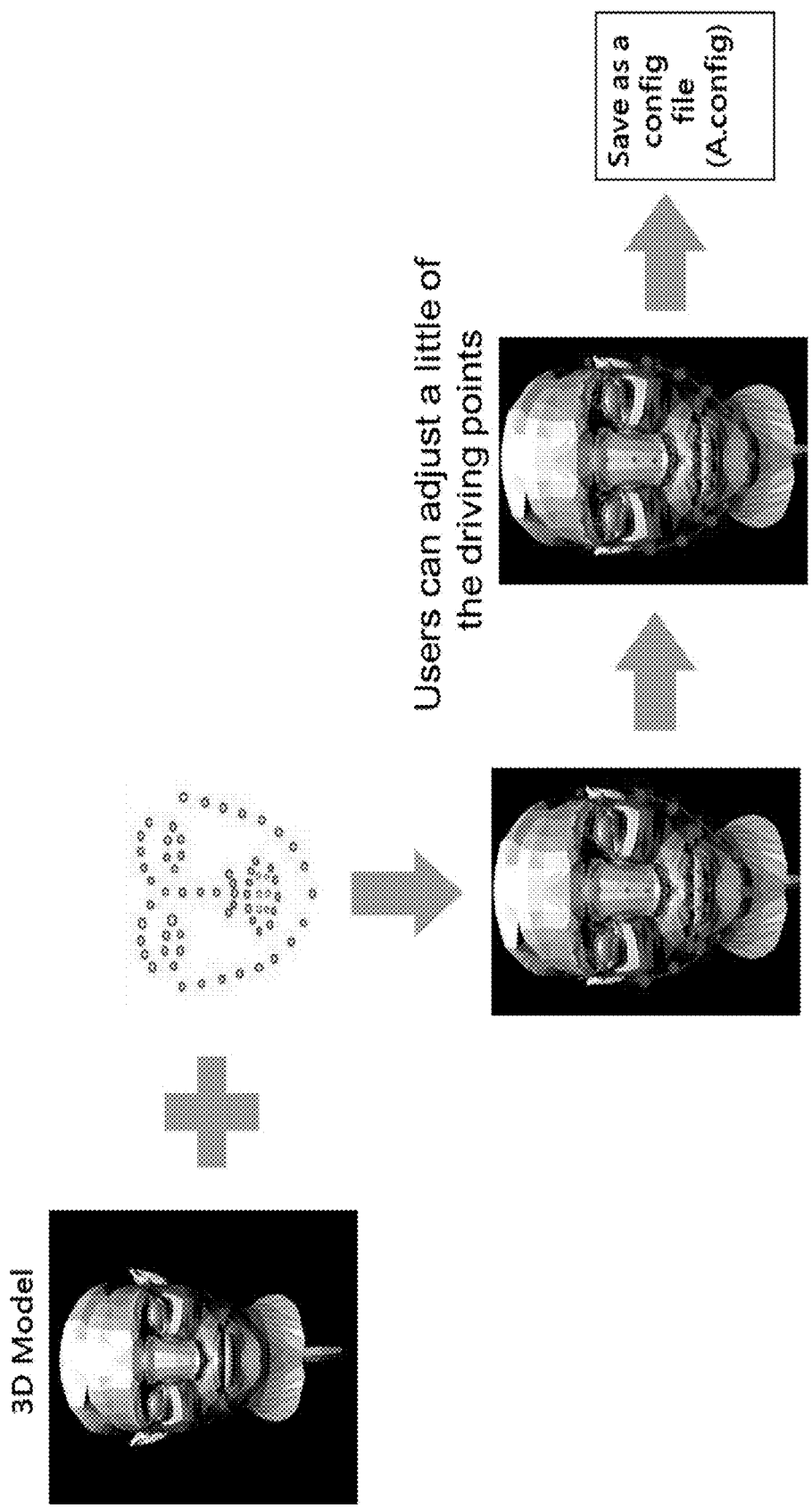
FIG. 6 is a diagram illustrating a control point reassignment and reconfiguration method according to a second embodiment of the present invention.

Referring also to FIGS. 5A and 6, the location of the facial feature control points which are previously configured can also be edited, changed or revised based upon user preferences or needs by manually dragging the cursor using a mouse or a touch screen. In order to prevent accidental incorrect assignment or attachment of any particular facial feature control point to any particular vertex 40 located among the thousands of vertices 40 in the triangular mesh contour of the 3D model, the software program for performing the method for configuring and setting up the facial feature control points on the 3D model is configured to draw a plurality of control lines, in which each control line can be made up of one or more linear line segments, and each of the linear line segment connects a pair of adjacent facial feature control points belonging to the same control line. However, the manner of connection of the pair of adjacent facial feature control points by the linear line segment (colored in green) does not have to be exact, whereby one end of the linear line segment is located at the center of one facial feature control point, and the other end of the same linear line segment is located at the center of another adjacent connected facial feature control point. Indeed, the manner of connection of the pair of adjacent facial feature control points by means of the linear line segment (colored in green) can also be achieved by having one end of the linear line segment being located at close proximity to one facial feature control point, and the other end of the same linear line segment to be located at close proximity of another adjacent connected facial feature control point. For example, the control point 32 is directly connected to the control point 33 in FIG. 5A, and the control point 10 is connected to the control point 11 by being connecting at close proximity of each of the connected facial feature control point. Each control line represent a grouping of facial feature control points which are functionally or structurally related, i.e. the control line for the control point 48 to the control point 59 is grouped by the mouth of the 3D model. One benefit obtained from the presence of the control lines is that, any incorrect assignment of facial feature control point caused by confusion of selecting facial feature control point among various facial feature control points which are located under different depths at close proximity can be prevented by having the control line as guidance during selection of the facial feature control point. The above editing or revision of locations of facial feature control points based upon user preferences can be described as a process of predefining the locations of the facial feature control points and the boundary control points for the step of predefining respective positions of the facial feature control points and the boundary control points on the 3D model prior to image morphing using inputs from facial tracking. This process includes of receiving a first user input, which includes the facial feature control points manually picked up and set in order by a user in advance; and of receiving a second user input, which includes the boundary control points manually picked up and set by the user. Another embodiment of this process of predefining locations of the facial feature control points and the boundary control points for the step of predefining respective positions of the facial feature control points and the boundary control points on the 3D model includes the receiving of a first user input, which includes the facial feature control points automatically picked up and set by an offline facial tracking process, and receiving of a second user input, which includes the boundary control points manually picked up and set by the user.

FIG. 5 (including FIG. 5A and FIG. 5B) are diagrams illustrating a facial feature control point pickup method according to a first embodiment of the present invention. In FIG. 5, the facial feature control points are picked up by user. In other words, there is a reference picture or image showing the operating rules for users that the numbers and the order of picked up facial feature control points of the 3D model should match those of the tracking points of the real-time facial image of the person. In addition, the position or location of the picked up facial feature control points can be revised by dragging the cursor using a mouse or a touch screen.

FIG. 6 is a diagram illustrating a control point reassignment and reconfiguration method according to a second embodiment of the present invention. Upon using the A.config by the facial tracking algorithm (see Steps S305 and S306) as described in FIG. 3, the tracking points of the real-time facial image are picked up by the facial tracking algorithm. For example, as shown superimposed on the corresponding 3D model, the bigger red facial feature control points are showing that the respective corresponding matching tracking points located at the same location on the facial image captured in real-time are not accurate enough, therefore, the user can manually adjust some of the facial feature control points to compensate or overcome the inaccuracies of the tracking points' locations (located at the bigger red control points). In other words, after the tracking points are obtained by facial tracking, the user can correct the assigned locations for some of the inaccurate facial feature control points to obtain improved matching consistency with the corresponding tracking points as observed in real-time. Such adjustments involve the user relocating the position of each facial feature control point by dragging the control point by the cursor to the correct vertex location using the mouse or the touch screen. Finally, the corrected control point assignment and configuration data can be saved as a new configure file, i.e. such as A.config.

Figure 7:
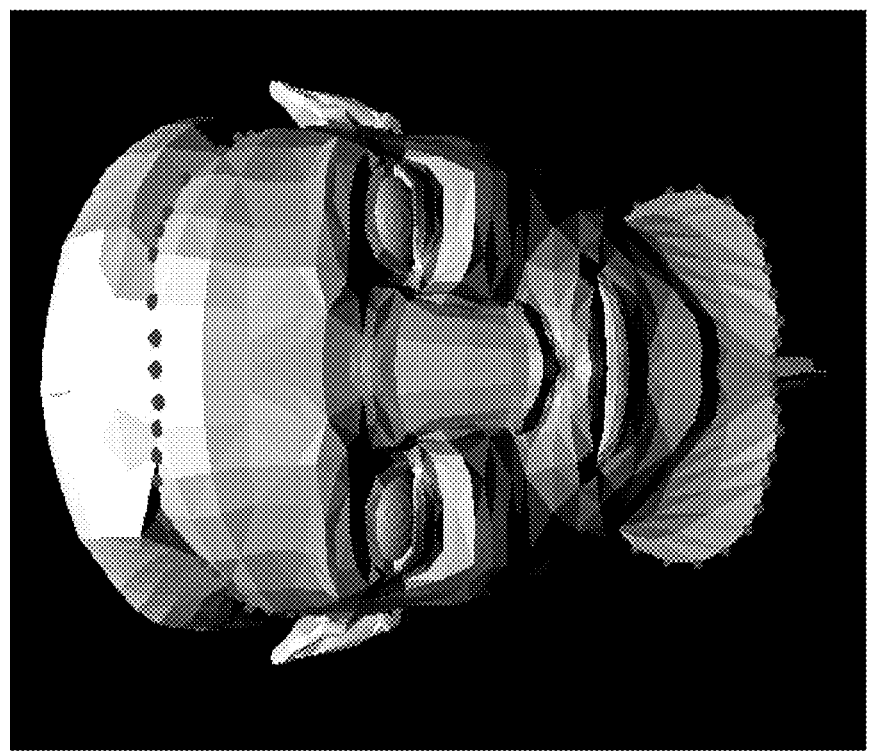
FIG. 7 is a diagram illustrating a boundary control point pickup method according to the embodiment of the present invention.

FIG. 7 is a diagram illustrating a boundary control point pickup method according to the embodiment of the present invention. In FIG. 7, a reference image is provided for showing suggested locations for the various boundary control points where the user should assign to form a closed boundary comprising of the boundary control points (visible in red color) located inside the closed boundary. All of the vertices of the 3D model located outside of the enclosed boundary region in the non-deformable region will not be adopted to morph. Indeed, the boundary control points are picked up from some of the 3D vertices on the 3D model which are chosen so as to define the boundary between the deformable region which can be adopted to morph and be affected by facial expressions, and the non-deformable region which are not affected by facial expressions. Be noted that, the location of picked-up facial feature control points and boundary control points can be revised by the control point reassignment and reconfiguration method according to the second embodiment of the present invention.

Figure 8:
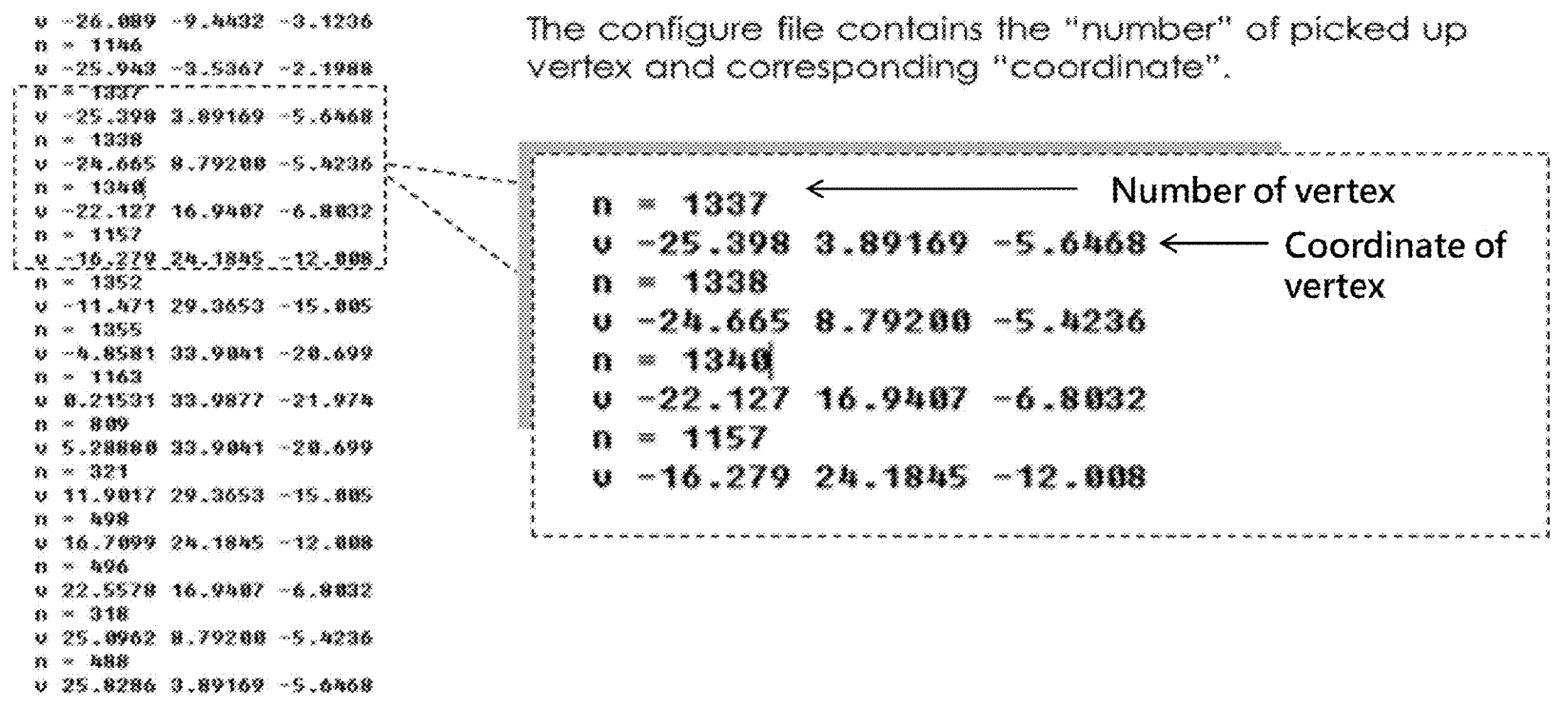

Referring to FIG. 8, a diagram contains detailed description of the location data for the facial feature control points and boundary control points corresponding to the 3D model to be organized as a file according to the embodiment of the present invention is shown. Be noted that, A.config contains the "number" of the assigned vertex (vertices) and the corresponding "coordinates" for the 3D location or position of the vertices in the 3D model.

Figure 9:
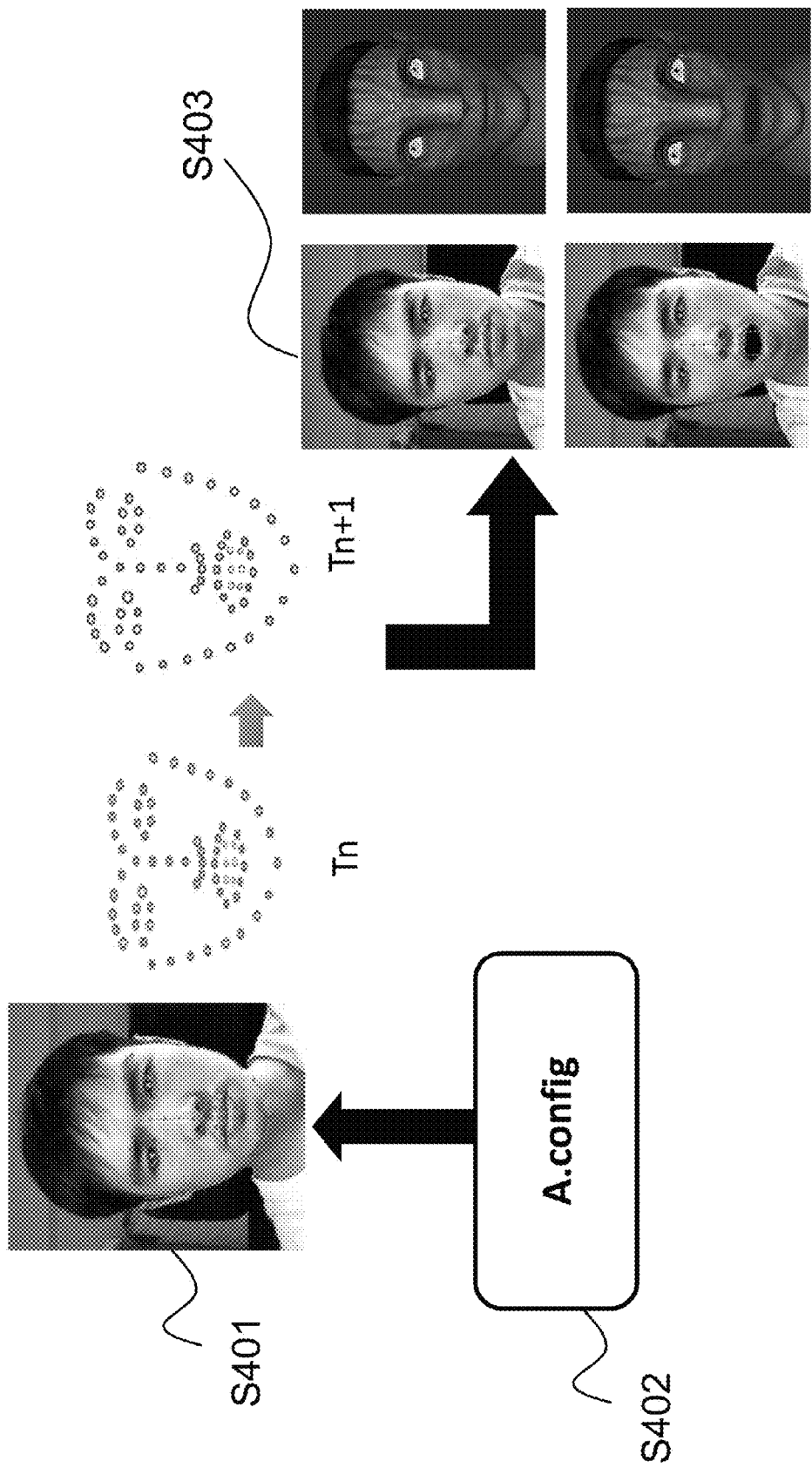
FIG. 9 is a diagram illustrating a 3D model morphing method driven by real-time facial tracking according to a fourth embodiment of the present invention.
Figure 10:
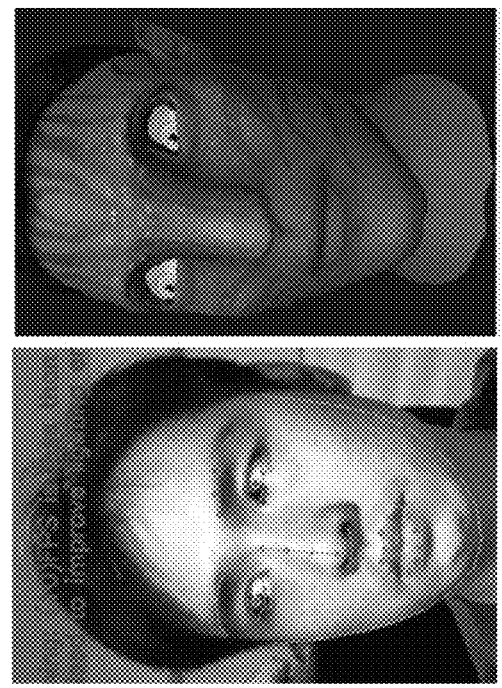
FIG. 10 is a diagram illustrating pupil movement detection according to an embodiment of the present invention.
Figure 10:
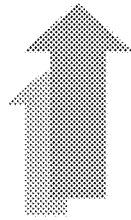
Figure 10:
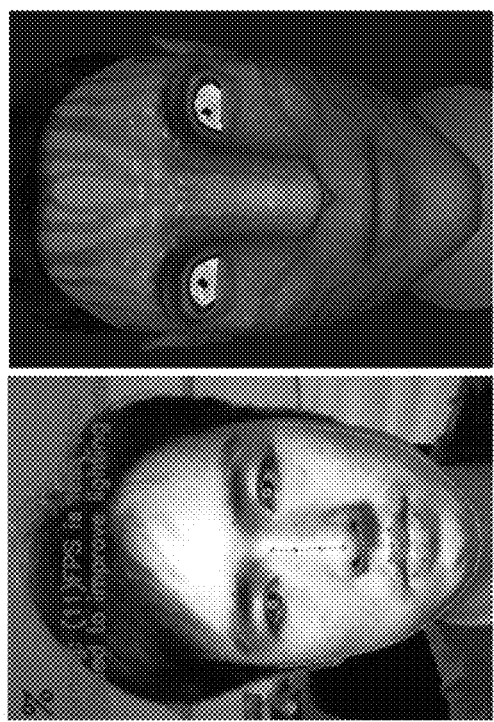

FIGS. 9 and 10 are diagrams illustrating a 3D model morphing method driven by real-time facial tracking according to a fourth embodiment of the present invention. First, in step S401, real-time facial tracking is performed so as to output 66 facial feature tracking points on the person according to the facial tracking algorithm of the embodiment of present invention. Second, the configure file "A.config" is loaded in step S402. Finally, the driving points on the real-time 3D avatar facial image are controlled to move or change by the real-time movements of the tracking points performed by the person during real-time facial tracking in order to morph the 3D avatar facial image as shown in Step S403. FIG. 10 specifically illustrates pupil movement detection according to the embodiment of the present invention.

Figure 14:
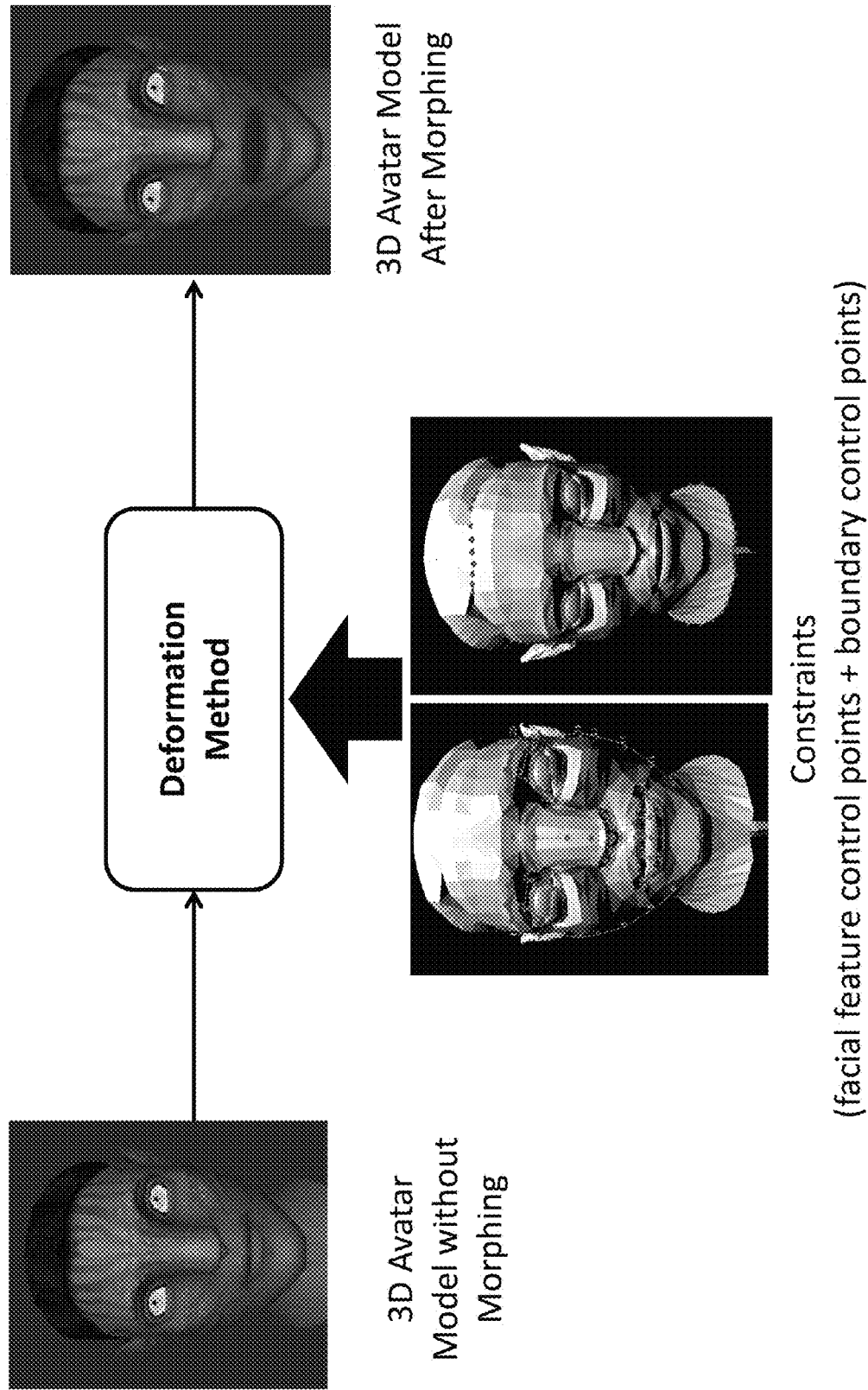
FIG. 14 illustrates a conceptual representation of the 3D avatar image prior to morphing when being subjected to the constraints of the facial feature control points and the boundary control points and using deformation method to produce the morphed 3D avatar image thereafter.
Figure 15:
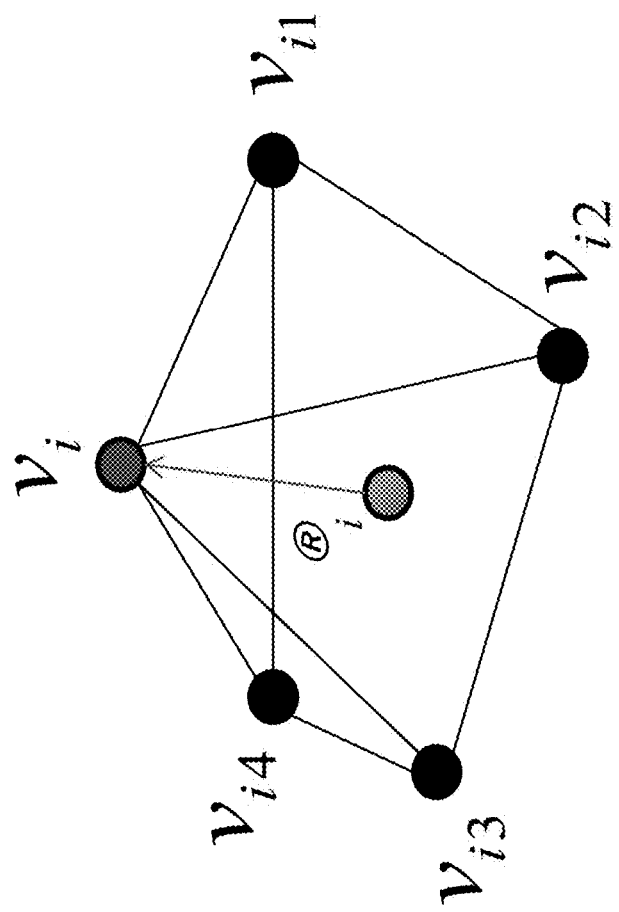
FIG. 15 illustrates a graphical representation of respective functional variables utilized in the deformation method.

Referring to FIG. 14, a conceptual representation of the real-time 3D avatar image prior to morphing being subjected to the constraints of the facial feature control points and the boundary control points and the deformation method used in the embodiments so as to produce the real-time 3D morphed avatar image is shown. The real-time 3D avatar image is being subjected to the constraints of both the facial feature control points and the boundary control points, and then utilizes a deformation method as described in FIG. 15 and in Equations [1]~[3] described below for producing a final real-time morphed 3D avatar image. Referring to FIG. 15 showing a graphical representation of the respective variables used in the deformation coordinate, the deformation method used in the embodiments of the present invention is defined as follow.

Equation [1]: To control a deformation of the positions of the vertices in the meshed contour of the 3D model, the user can input the deformation positions for a subset of N mesh vertices. The deformation position data is used to compute a new deformation coordinate for each point i in the graph. In equation [1] below, the controlled point prior to deformation is defined as the following:

$$\delta_i = L(v_i) = v_i - \frac{1}{|N_i|} \sum_{j \in N_i} v_j \qquad [1]$$

in which $v_i$ is defined as the controlled points, $N_i$ is defined as the indices of neighboring vertices of $v_i$ and the $L(\ )$ operator is the Laplacian operator.

The deformation positions of the mesh vertices $v_i'$ are then obtained by solving the following minimization operation:

$$\min_{v'} \left( \sum_{i=1}^{N} \|L(v_i') - \delta_i\|^2 + \sum_{i \in C} \|v_i' - u_i\|^2 \right) \qquad [2]$$

Rewriting the above minimization operation [2] in matrix form yield the following set of equation [3]:

$$0 = \frac{\partial \|Ax - B\|^2}{\partial x} = 2A^T Ax - 2A^T B \Rightarrow A^T Ax = A^T B$$

To solve for x in this equation [3], $x = (A^T A)^{-1} A^T B$ where x is the weightings needed to calculate for the deformation of all the mesh vertices.

Figure 16:
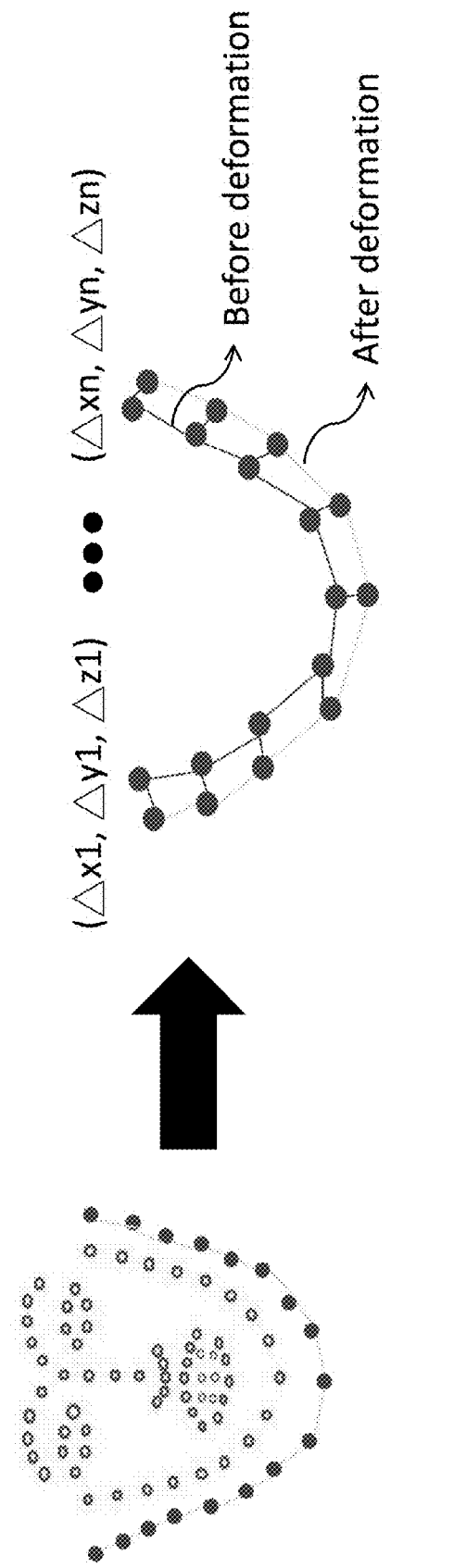
FIG. 16 illustrates a method for determination of deformation rate at before and after adjustment for each facial tracking point.

In an alternative embodiment, the morphing effect on specified individual region of the real-time facial image can achieve more exaggerated bigger movements, by partially adjust the morphing effect parameters on each driving point of the 3D model. Referring to FIG. 16, the deformation rate before adjustments prior to facial tracking for the facial tracking point 1 to facial tracking point n are respectively defined, namely: $(\Delta x1, \Delta y1, \Delta z1) \ldots (\Delta xn, \Delta yn, \Delta zn)$. Stated in another way, the respective deformation rate before adjustment for each facial tracking point includes the following:

Facial Tracking Point 1: $(\Delta x1, \Delta y1, \Delta z1)$

Facial Tracking Point 2: $(\Delta x2, \Delta y2, \Delta z2)$

Facial Tracking Point 3: $(\Delta x3, \Delta y3, \Delta z3)$

...

Facial Tracking Point n: $(\Delta xn, \Delta yn, \Delta zn)$

The deformation rate after adjustment for each facial tracking point includes the following:

Facial Tracking Point 1: $(a1*\Delta x1, a2*\Delta y1, a3*\Delta z1)$

Facial Tracking Point 2: $(b1*\Delta x2, b2*\Delta y2, b3*\Delta z2)$

Facial Tracking Point 3: $(c1*\Delta x3, c2*\Delta y3, c3*\Delta z3)$

...

Facial Tracking Point n: $(X1*\Delta xn, X2*\Delta yn, X3*\Delta zn)$

In the deformation rate listed above for after adjustment, a deformation rate of each facial feature control point can be adjusted by multiplying or adding one or more adjustment factor value, namely a1, b1, c1, a2, b2, c2, a3, b3, c3, etc. ... to partially adjust the deformation effect. As a result, the deformation rates before and after adjustment for each facial tracking point are being used to drive the image deformation adjustments required for the 3D avatar.

Figure 17:
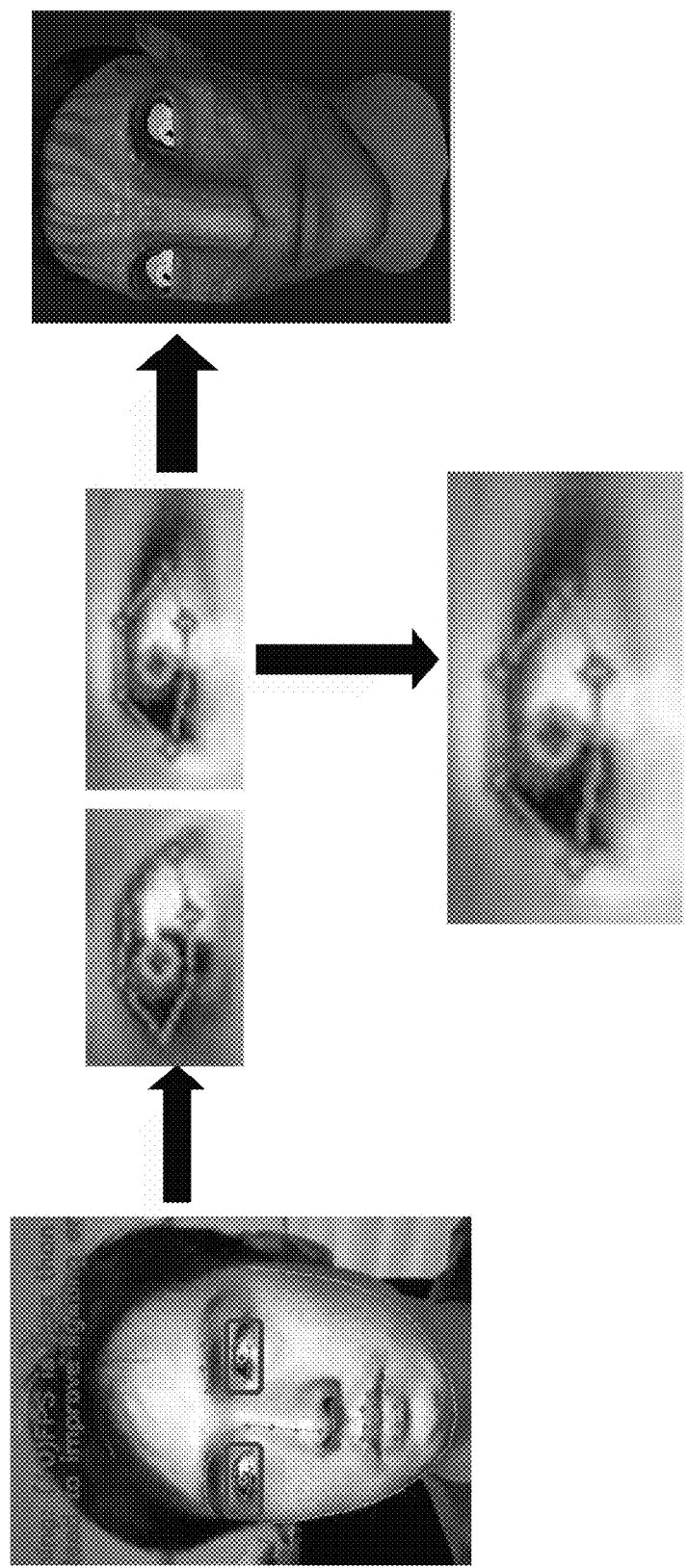
FIG. 17 is a diagram illustrating a pupil movement detection method according to a third embodiment of the present invention.
Figure 18:
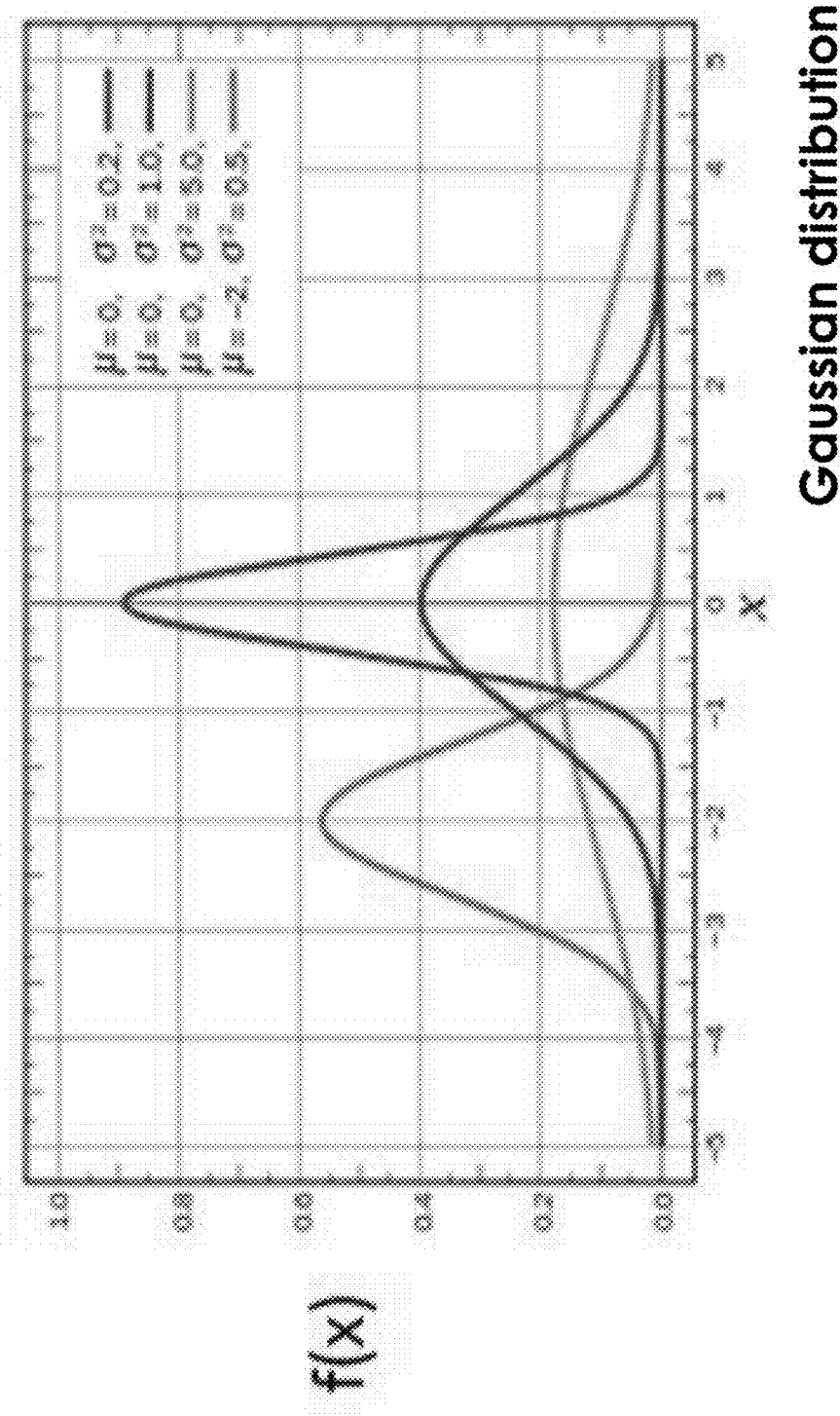
FIG. 18 shows a Gaussian distribution to amplify the pupils' gray level of color at point x to find the pupils' positions.

FIG. 17 is a diagram illustrating a pupil movement detection method according to a third embodiment of the present invention. The facial tracking of a real-time image capture of a user provides a total of 66 tracking points. These tracking points are divided into several groups, including groups for the eye, face, nose, and mouth. In the set of tracking points belonging to the eye group, additional technical features can be extracted therein in the form of the pupil as an example. Since the pupil belongs to the eye group, the entire eye group can be searched in order to obtain the technical features directed to the pupils by means of checking the color difference between the pupils and other regions enclosed within the eye group. Be noted that, the color distribution of the eye group can be assumed as Gaussian distribution. Referring also to FIG. 18, Gaussian distribution can be used to amplify the pupils' gray level of color at point x to find the pupils' position as shown below in Equation [4]:

$$f(x) = \frac{1}{\sigma\sqrt{2\pi}} e^{-\frac{(x-\mu)^2}{2\sigma^2}} \quad [4]$$

The parameter μ in the above equation is the mean or expectation of the distribution (and also its median and mode). The parameter σ is its standard deviation; its variance is therefore σ2.

Then the center points of the pupils are calculated by the following Equation (5) in two $$r_m = \frac{\sum f_i r_i}{\sum f_i} \quad [5]$$

dimensional space (x, y):
where $r_m$: is the center point (x, y) of the pupil; $f_i$: is the gray level of color with Gaussian distribution amplification at point (x, y), and $r_i$: represents the point (x, y).

Figure 19:
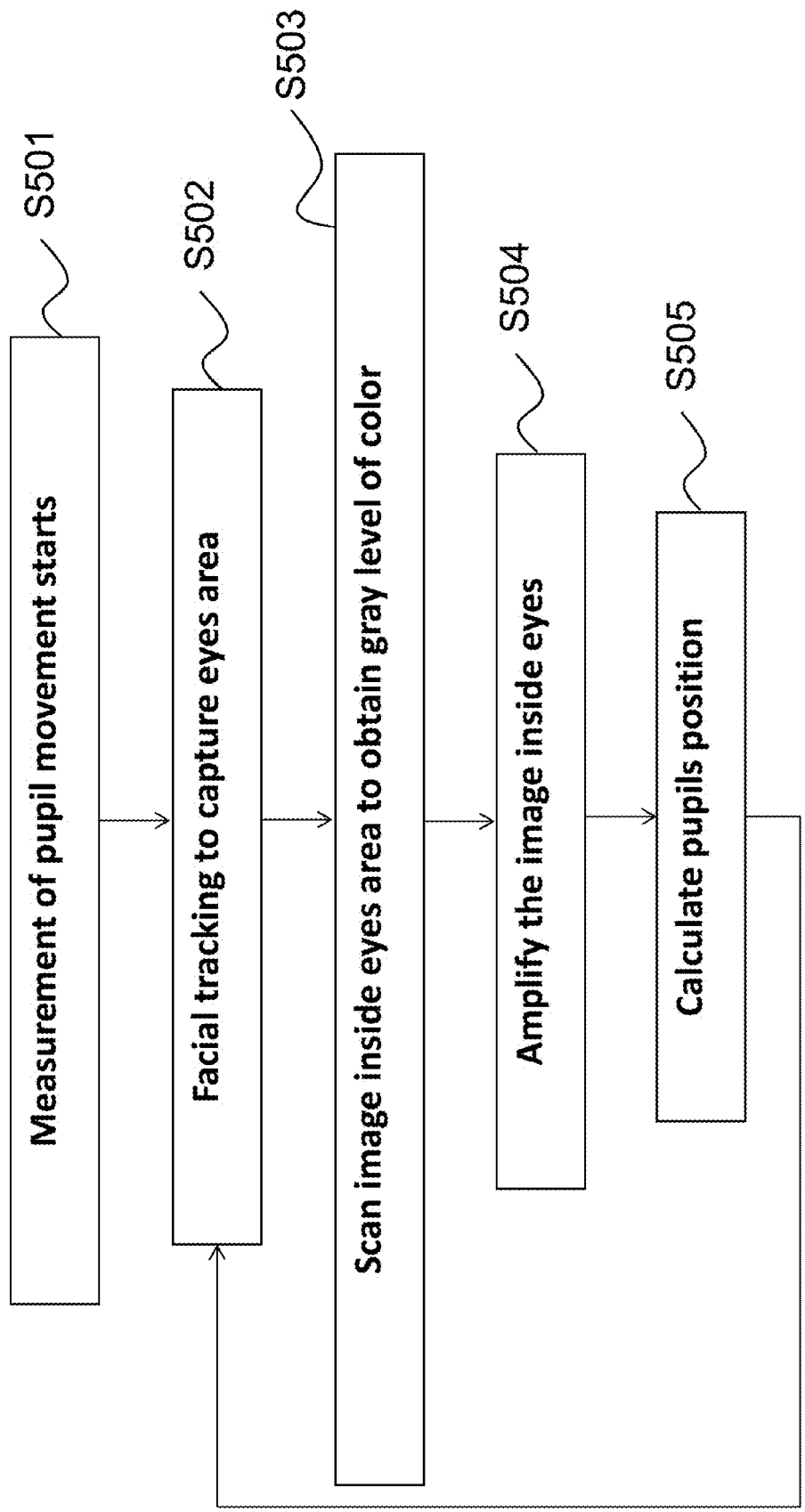
FIG. 19 shows a flow chart for a method for pupils' movement detection.

Referring to FIG. 19, a method for pupils movement detection is described as follow: In Step S501, measurements of pupil movement are gathered. In Step S502, facial tracking is performed to capture the eye areas. In Step S503, a plurality of images are scanned inside eyes area to obtain gray level of color. In Step S504, the scanned image inside the eye areas are amplified as shown in FIG. 18. In step S505, pupil positions are then calculated.

Figure 11:
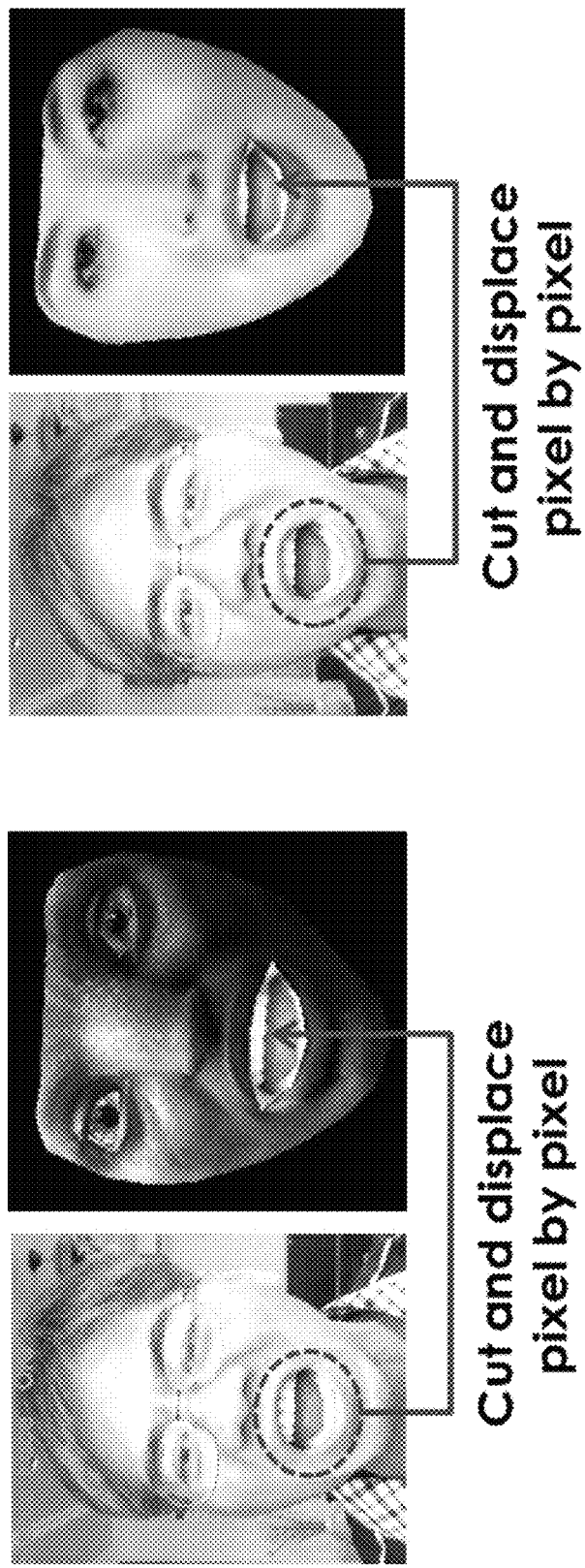
FIG. 11 is a diagram illustrating how to track teeth and tongue according to an embodiment of the present invention.

FIG. 11 is a diagram illustrating a method to track teeth and tongue during facial tracking according to an embodiment of the present invention. According to the tracking points of the mouth group, the mouth group of the 3D avatar image can be cut out while the user opens his mouth. Then the cut area of the mouth group is filled by a real-time replacement or substitute image inside the mouth comprising of the teeth and tongue of the user pixel by pixel, as being captured from camera in real time during facial tracking, and this is referred to as a tongue and teeth displacement in the instant disclosure.

Figure 12:
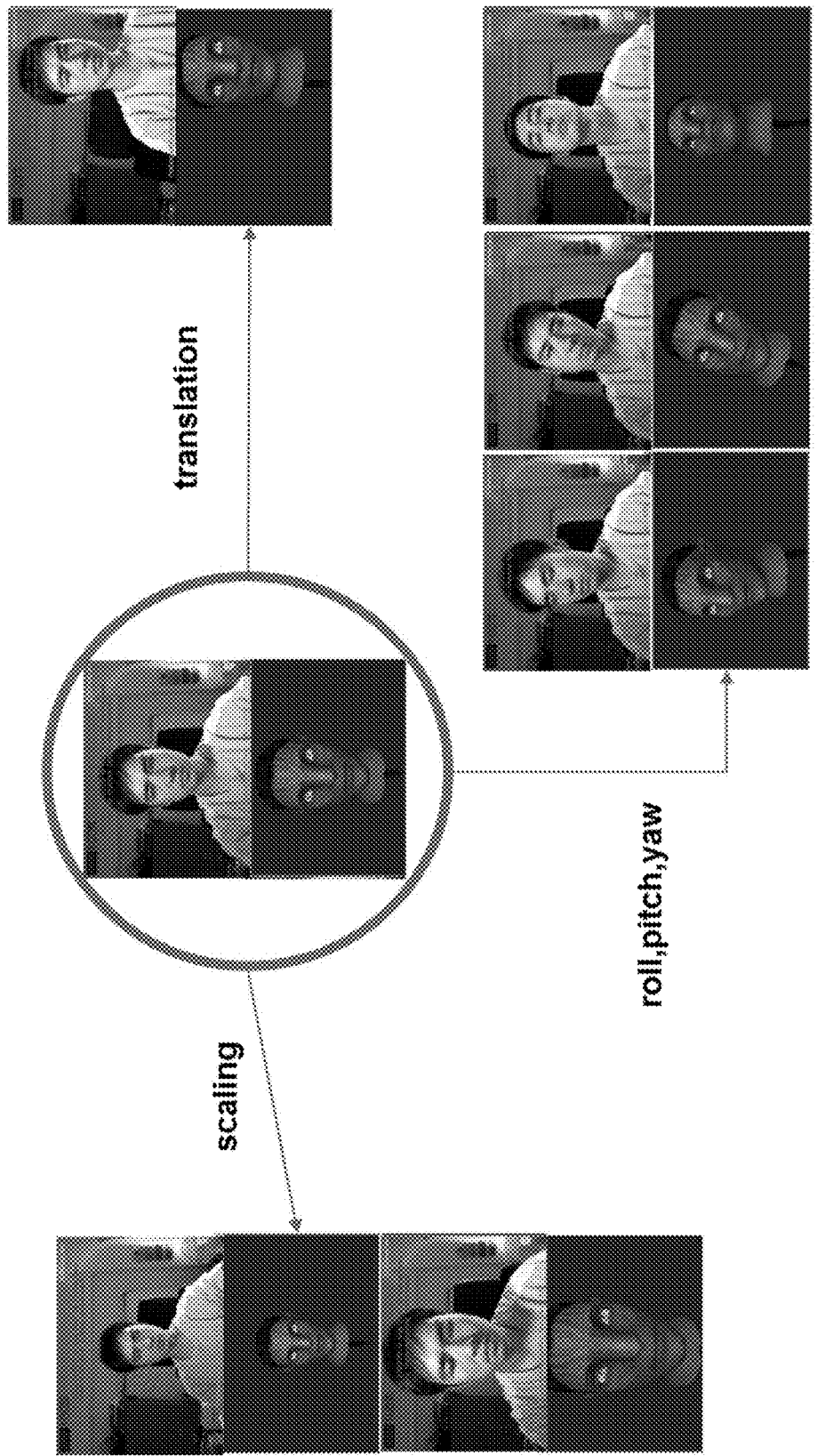
FIG. 12 is a diagram illustrating scaling, translation and rotation of the real-time 3D avatar image according to the embodiment of the present invention.

FIG. 12 is a diagram illustrating the scaling, translation and rotation of the real-time 3D avatar image according to the embodiment of the present invention. In addition to morphing of the real-time 3D avatar image, the facial tracking of the person also provides scaling, translation, and (3D) posture (such as, roll, pitch, and yaw) measurements of the person's head to simulate the real-time avatar image's translation and rotation.

Figure 13A:
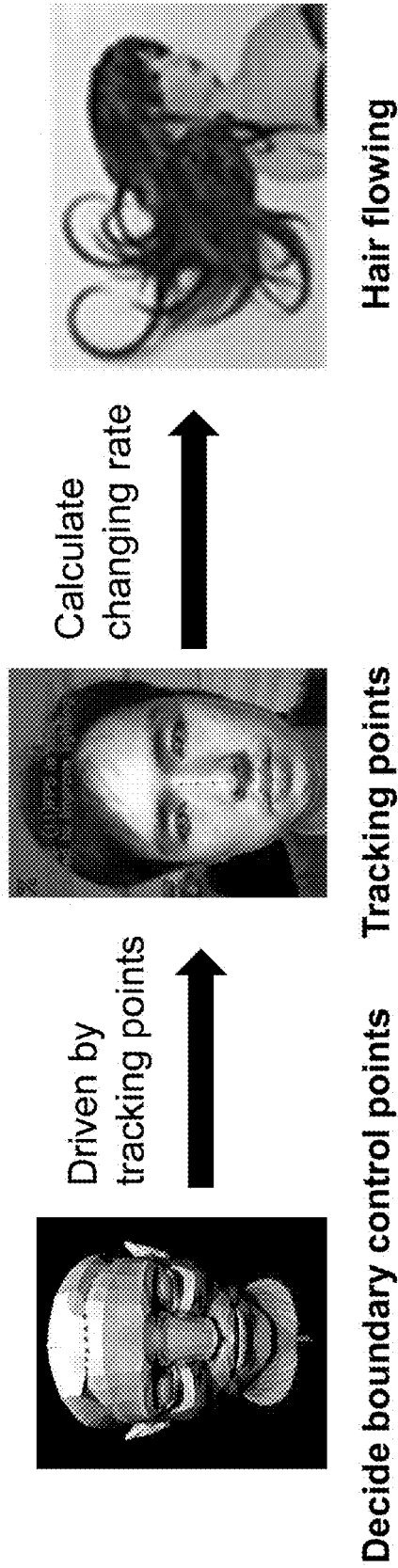
FIGS. 13A and 13B are diagrams illustrating hair flowing effect simulation of the embodiment of present invention.
Figure 13B:
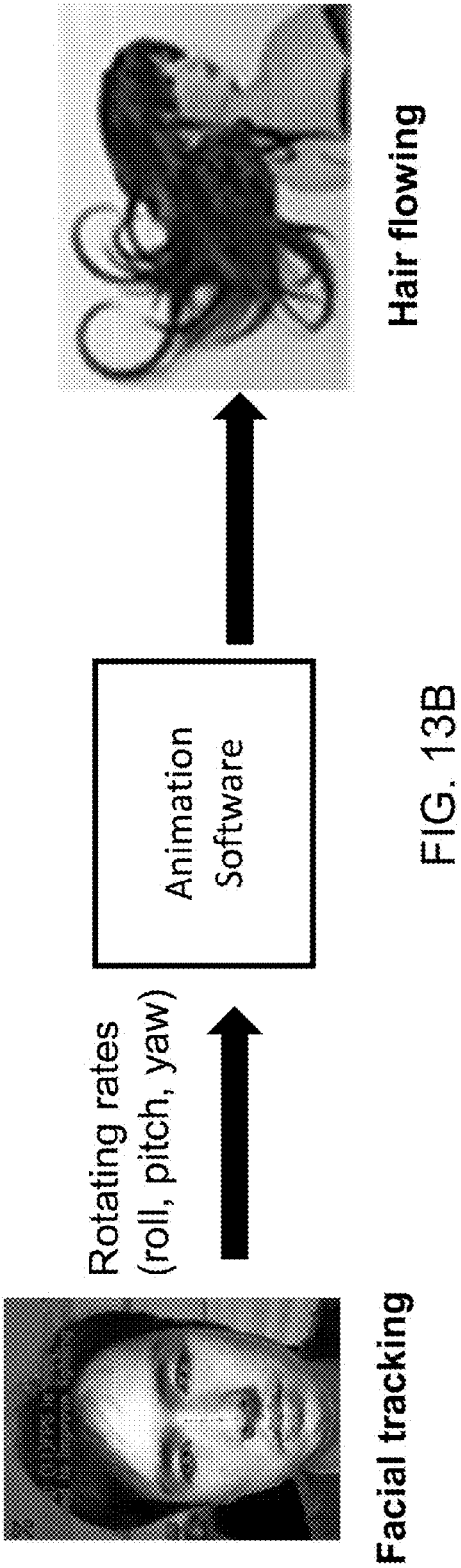

FIGS. 13A and 13B are diagrams illustrating hair flowing effect simulation. Hair flowing is a physical phenomenon. There are two ways to implement it. One is achieved by driving points and boundary control points. Users can easily choose the boundary of hair region while picking up the boundary control points. Then hair flowing effect simulation is generated by calculating changes of physical parameters such as angular speed of head rotation, linear speed of head translation and so on, obtained by facial tracking. The other way of implementing hair flowing effect simulation is achieved by calculating the user's angular speed of head rotation, such as roll, pitch and yaw, which are results of the facial tracking. Then the angular speed of head rotation can be used by the animation software to implement hair flowing effect simulation.

Figure 20:
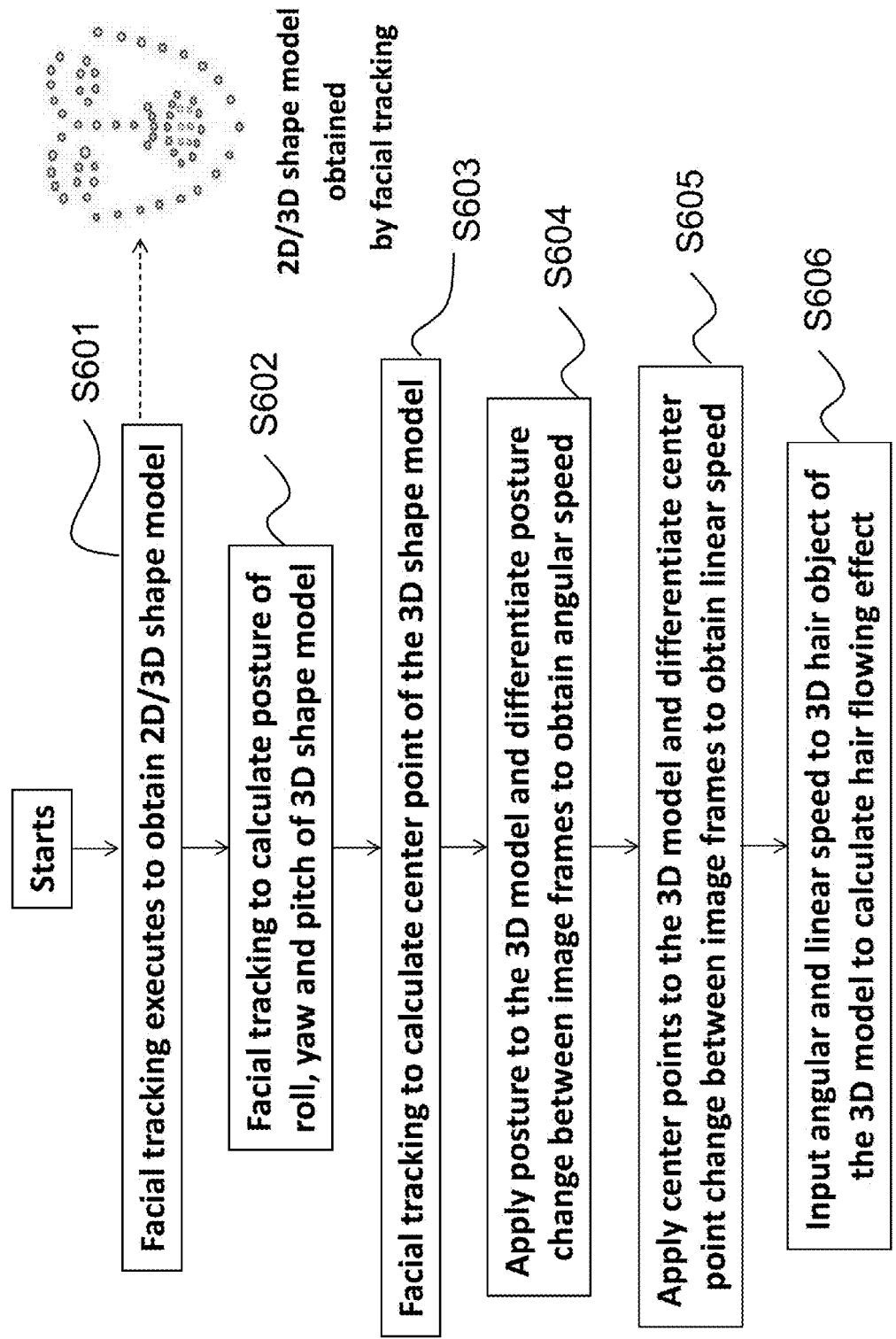
FIG. 20 shows a flow chart of a hair flowing effect simulation implementation method.

Referring to FIG. 20, hair flowing effect simulation can be achieved via a hair flowing effect simulation implementation method as described in the following steps: Step S601: facial tracking is performed to obtain or derive a 2D/3D shape model. Step S602: facial tracking is performed to calculate the posture of the roll, yaw and pitch of 3D shape model. Step S603: facial tracking is continued to calculate a center point of the 3D shape model. Step S604: a posture is applied to the 3D model, and posture changes are differentiated between image frames to obtain angular speed. Step S605: center points are applied to the 3D model and center point changes are differentiated between image frames to obtain linear speed. Step S606: the angular and linear speeds are inputted to the 3D hair object of the 3D model to calculate hair flowing simulation effect.

Figure 21:
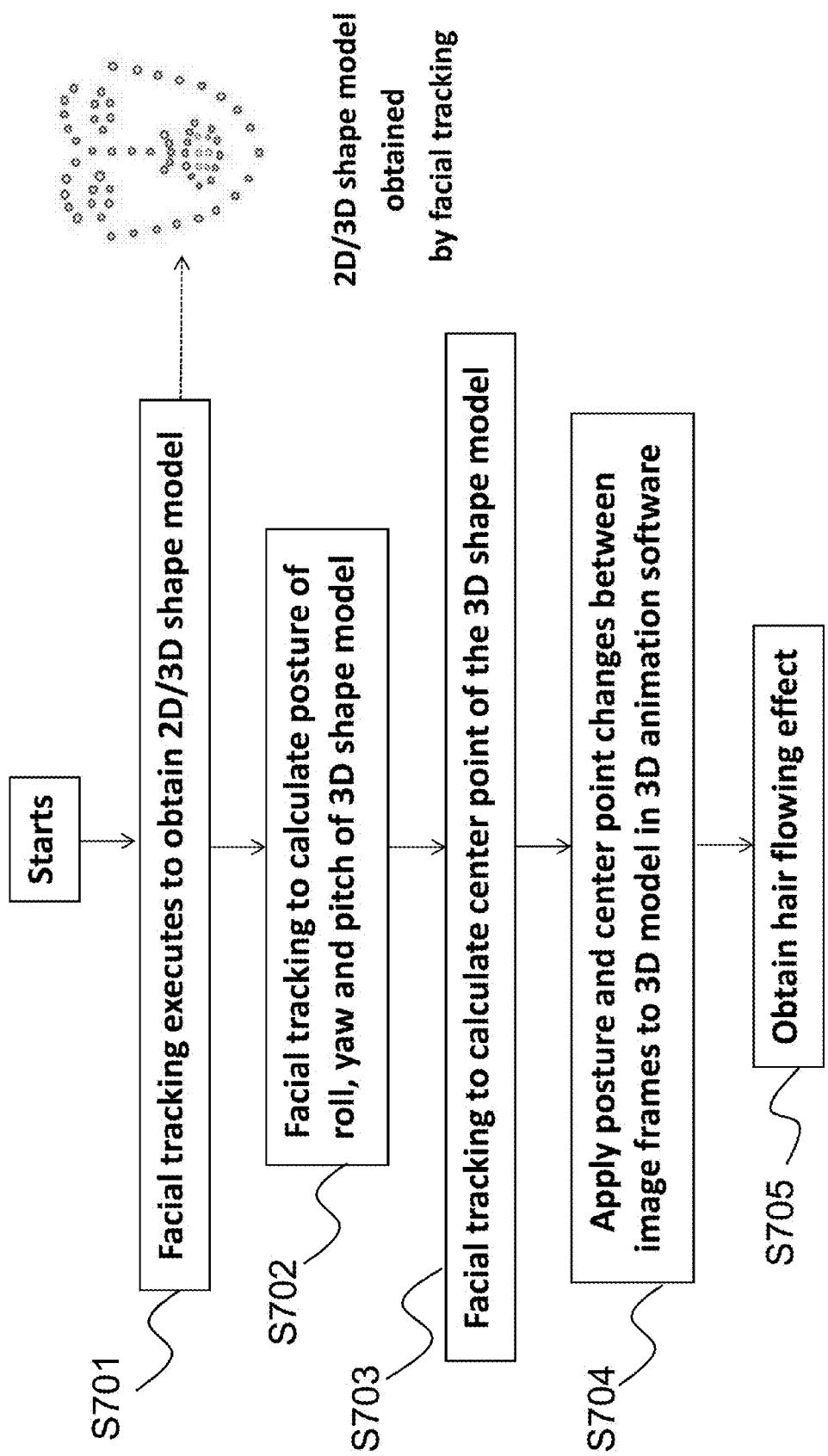
FIG. 21 shows a flow chart of another hair flowing effect simulation implementation method incorporated with 3D animation software.

Referring to FIG. 21, another hair flowing effect simulation incorporated with 3D animation software can be achieved via a hair flowing simulation implementation method as described in the following steps: Step S701: facial tracking is performed to obtain or derive a 2D/3D shape model. Step S702: Facial tracking is conducted to calculate the posture of the roll, yaw and pitch of the 3D shape model. Step S703: Facial tracking is continued to calculate a center point of the 3D shape model. Step S704: posture and center point changes between image frames are applied to the 3D model in the 3D animation software. Step S705: the hair flowing effect simulation is obtained.

In the instant disclosure, in yet another embodiment, an electronic device equipped with a camera and a display can be configured with a memory comprising a software performing the method of 3D model morphing driven by facial tracking of the embodiments of present invention. In still yet another embodiment, two or more electronic devices can each be equipped with a camera and a display so that more than one person can perform real-time facial tracking to see and perform morphing in real-time to more than one real-time 3D avatar image.

It is believed that the present embodiments and their advantages will be understood from the foregoing description, and it will be apparent that various changes may be made thereto without departing from the spirit and scope of the embodiments or sacrificing all of its material advantages.

What is claimed is:

1. A method of 3D model morphing driven by facial tracking, comprising:
   predefining respective positions of a plurality of facial feature control points and a plurality of boundary control points on a provided 3D model;
   providing and utilizing a real-time facial tracking algorithm to output a plurality of real-time 3D facial feature points;
   driving and controlling the predefined facial feature control points on the provided 3D model by the outputs of the real-time 3D facial feature points obtained by real-time facial tracking using a single camera; and
   performing a morphing/deformation process, wherein the 3D facial feature points on the provided 3D model are transformed in relation according to the facial feature control points and the boundary control points that have been predefined, which are driven by the outputs of real-time facial tracking by an electronic device;
   wherein the boundary control points are used to constrain a morphing region.

2. The method as claimed in claim 1, further comprising a process of predefining locations of the facial feature control points and the boundary control points for the step of predefining respective positions of the facial feature control points and the boundary control points on the provided 3D model, comprising the steps of:
   receiving a first user input, wherein the first user input comprises the facial feature control points which is manually picked up and set in order by a user in advance; and
   receiving a second user input, wherein the second user input comprises the boundary control points which manually picked up and set by the user.

3. The method as claimed in claim 1, further comprising a process of predefining locations of the facial feature control points and the boundary control points for the step of predefining respective positions of the facial feature control points and the boundary control points on the provided 3D model, comprising the steps of:
   receiving a first user input, wherein the first user input comprises the facial feature control points which is automatically picked up and set by an offline facial tracking process; and
   receiving a second user input, wherein the second user input comprises the boundary control points which is manually picked up and set by the user.

4. The method as claimed in claim 1, wherein the facial feature control points on the provided 3D model are driven and controlled by the facial tracking points' position difference between image frames of real-time facial tracking, where the real-time facial tracking continuously updates and outputs the position difference of the facial feature points, to morph a 3D avatar.

5. The method as claimed in claim 1, wherein the facial feature control points and the boundary control points are picked up by a mouse or a touch screen.

6. The method as claimed in claim 1, wherein a deformation rate of each facial feature control point is adjusted by multiplying or adding one or more adjustment factor value to partially adjust the deformation effect.

7. The method as claimed in claim 1, wherein a method to detect pupils' movement is provided during facial tracking, comprising the steps of:
   capturing a plurality of eye areas during facial tracking;
   scanning a plurality of images inside the eyes area to obtain gray level of color;
   amplifying the scanned image inside the eye areas; and
   calculating a plurality of pupil positions.

8. The method as claimed in claim 1, wherein facial tracking is performed to transfer and substitute real-time tongue and teeth images to the provided 3D model by cutting out the mouth group of the 3D avatar image while the mouth of the person is opened, and filling the cut area of the mouth group by a real-time substitute image inside the mouth comprising of the teeth and tongue of the user pixel by pixel as captured from a camera in real time.

9. The method as claimed in claim 1, wherein controlling of the 3D model's scaling, translation and posture are performed by facial tracking.

10. The method as claimed in claim 1, wherein the facial feature control point is reassigned and reconfigured by dragging the facial feature control point to another vertex using the mouse or the touch screen on the provided 3D model.

11. An electronic device, comprising:
    at least one camera performing facial tracking of one person;
    at least one display;
    a non-transitory memory; and
    a software stored on the non-transitory memory;
    wherein the software is to perform a method of 3D model morphing driven by facial tracking, the method of 3D model morphing driven by facial tracking, comprising the steps of:
    predefining respective positions of a plurality of facial feature control points for facial features and a plurality of boundary control points on a provided 3D model;
    providing and utilizing a real-time facial tracking algorithm to output a plurality of real-time 3D facial feature points;
    driving and controlling the predefined facial feature control points on the provided 3D model by the outputs of the real-time 3D facial feature points obtained by real-time facial tracking; and
    performing a morphing/deformation process, wherein the points on the provided 3D model are transformed in relation according to the facial feature control points and the boundary control points that have been predefined, which are driven by the outputs of real-time facial tracking;
    wherein the boundary control points are used to constrain a morphing region.

12. The electronic device as claimed in claim 11, wherein the method of 3D model morphing driven by facial tracking in the software further comprising a process of predefining locations of the facial feature control points and the boundary control points for the step of predefining respective positions of the facial feature control points and the boundary control points on the provided 3D model, comprising the steps of:
    receiving a first user input, wherein the first user input comprises the facial feature control points which is manually picked up and set in order by a user in advance; and
    receiving a second user input, wherein the second user input comprises the boundary control points which manually picked up and set by the user.

13. The electronic device as claimed in claim 11, wherein the method of 3D model morphing driven by facial tracking in the software further comprising a process of predefining locations of the facial feature control points and the boundary control points for the step of predefining respective positions of the facial feature control points and the boundary control points on the provided 3D model, comprising the steps of:
   receiving a first user input, wherein the first user input comprises the facial feature control points which is automatically picked up and set by an offline facial tracking process; and
   receiving a second user input, wherein the second user input comprises the boundary control points which is manually picked up and set by the user.

14. The electronic device as claimed in claim 11, wherein the facial feature control points on the provided 3D model are driven and controlled by the facial tracking points' position difference between image frames of real-time facial tracking, where the real-time facial tracking continuously updates and outputs the position difference of the facial feature points, to morph a 3D avatar.

15. The electronic device as claimed in claim 11, wherein the facial feature control points and the boundary control points are picked up by a mouse or a touch screen.

16. The electronic device as claimed in claim 11, wherein a deformation rate of each facial feature control point is adjusted by multiplying or adding one or more adjustment factor value to partially adjust the deformation effect.

17. The electronic device as claimed in claim 11, wherein a method to detect pupils' movement is provided during facial tracking, comprising the steps of capturing a plurality of eye areas during facial tracking;
   scanning a plurality of images inside the eyes area to obtain gray level of color;
   amplifying the scanned image inside the eye areas; and
   calculating a plurality of pupil positions.

18. The electronic device as claimed in claim 11, wherein facial tracking is performed to transfer and substitute real-time tongue and teeth images to the provided 3D model by cutting out the mouth group of the 3D avatar image while the mouth of the person is opened, and filling the cut area of the mouth group by a real-time substitute image inside the mouth comprising of the teeth and tongue of the user pixel by pixel as captured from a camera in real time.

19. A method of 3D model morphing driven by facial tracking, comprising:
   predefining respective positions of a plurality of facial feature control points and a plurality of boundary control points on a provided 3D model;
   providing and utilizing a real-time facial tracking algorithm to output a plurality of real-time 3D facial feature points;
   driving and controlling the predefined facial feature control points on the provided 3D model by the outputs of the real-time 3D facial feature points obtained by real-time facial tracking using a single camera;
   performing a morphing/deformation process, wherein the points on the provided 3D model are transformed in relation according to the facial feature control points and the boundary control points that have been predefined, which are driven by the outputs of real-time facial tracking by an electronic device;
   wherein controlling of the 3D model's scaling, translation and posture are performed by facial tracking; and
   wherein the boundary control points are used to constrain a morphing region.

* * * * *